June 25, 1946.     D. L. SWASEY     2,402,709
CAMOUFLAGE NET
Filed Aug. 27, 1943     2 Sheets-Sheet 1
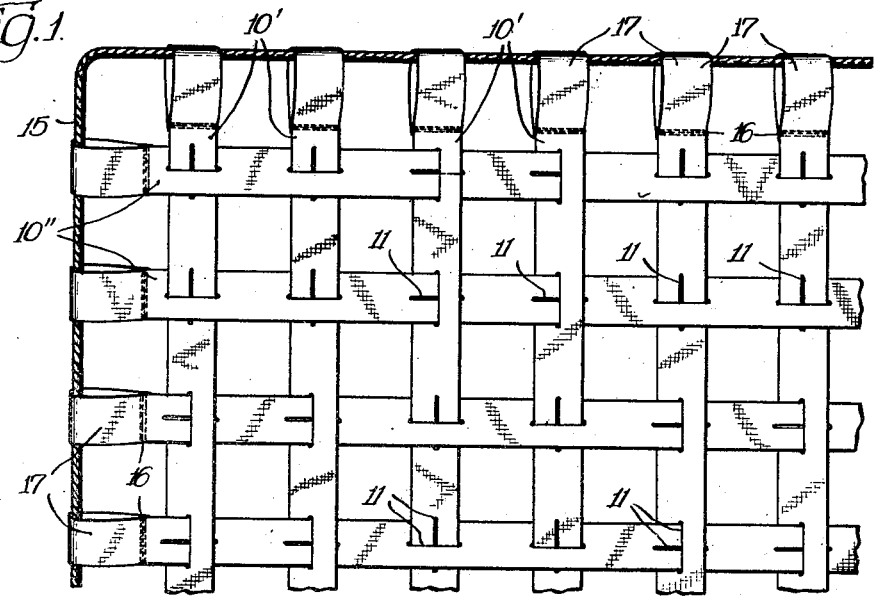
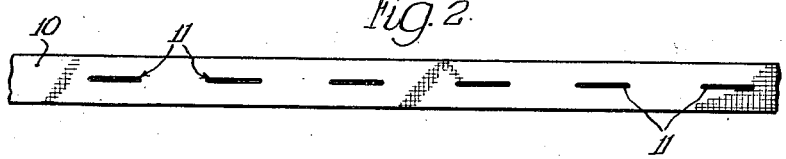
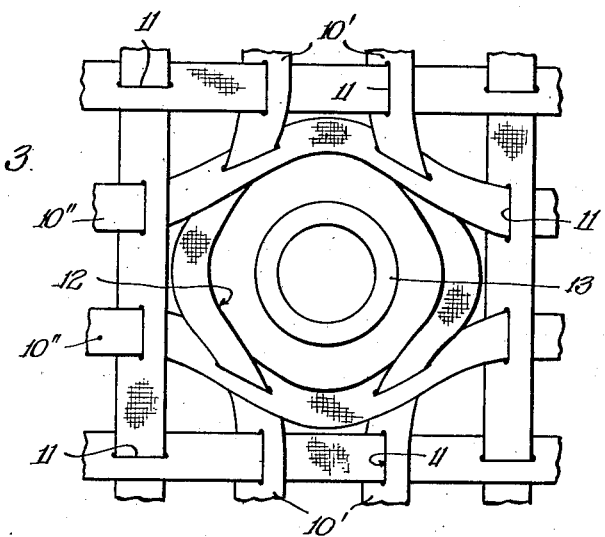
INVENTOR.
David L. Swasey,
BY June 25, 1946.   D. L. SWASEY   2,402,709
CAMOUFLAGE NET
Filed Aug. 27, 1943   2 Sheets-Sheet 2

INVENTOR.
David L. Swasey,
BY Brown, Jackson, Boettcher Dienner
attys

Patented June 25, 1946

2,402,709

UNITED STATES PATENT OFFICE 2,402,709

CAMOUFLAGE NET

David L. Swasey, Taunton, Mass., assignor to Electric Boat Company, Groton, Conn., a corporation of New Jersey Application August 27, 1943, Serial No. 500,215

4 Claims. (Cl. 28—78)

The present invention relates to improvements in camouflage nets for naval and land military use. For example, in naval use these nets can be used for the draping of PT boats and other similar craft, and for camouflaging the decks and armament of transports, moored warships, etc. In land use these nets can be employed for camouflaging guns, gun emplacements, pill boxes, ammunition dumps, concealed dwellings, vehicles, tanks, grounded airplanes and other land targets.

The effectiveness of any camouflage net depends upon two factors; (1) the textured surface of the net itself, and (2) the broken appearance of the irregular shadows cast by the net on the surface beneath. In other words, the camouflage net must not be looked upon as a solid screen, i. e., the openings in the net are as important as the opaque areas covered by the garnishing. In order to obtain this effect the customary method in use today is to erect a wire or twine net and to garnish this net with strips of burlap or cotton osnaburg. The net is generally made up of chicken wire or coarse fish net, and the garnishing strips are usually about five feet long and about two inches in width, being woven through the net in an irregular pattern. For many years the army has used fish nets garnished in this manner for the concealment of material in the field. It is obvious that these prior methods and apparatus involve a considerable expenditure of time and labor, first in the erection and placing of the net, and second in the threading of the garnishing strips through the net. Considerable time and labor are also involved in dismantling or taking down the net and its garnishment, and if chicken wire is used as the supporting body of the net this has the further disadvantage of being awkward and bulky to handle and store.

My improved construction of camouflage net avoids all of the foregoing objections. One of its distinctive features is that the net and the garnishment are one and the same, i. e., the net is self-garnishing. More particularly, the net carries or constitutes its own garnishing and there is no need of having to weave separate garnishing strips through it. This feature is obtained by constructing the main body of the camouflage net substantially entirely of strips of fabric webbing which are interthreaded in crisscross or right angle relation to form a large mesh open-work pattern, these fabric strips thus constituting both the main supporting body of the camouflage net and also the garnishing. The strips can be loosely shifted or draped relatively to one another to produce any desired irregularity of pattern or camouflage effect. The strips preferably consist of light weight cotton webbing which can be made in different colors and which are processed to be fire-retardant, mildew-proof and water repellant.

Another distinctive feature of my improved construction of camouflage net is a novel interlocking interthreaded relation between the strips or strands of webbing which run in one direction and the strips or strands of webbing which run substantially at right angles thereto. More particularly, all strips in the lengthwise series and all strips in the crosswise series of the net are provided with longitudinally spaced openings therein through which strips of the other series can be threaded, each strip having a predetermined sequence of being threaded through openings in other strips and having other strips threaded through its openings, whereby to produce this unique interlocking interthreaded relationship. By virtue of this unique relationship, each of the strips can be slid endwise a limited distance out of position and also pushed sidewise a limited distance out of position so as to produce any desired irregularity of pattern in the net, and also so as to enable a relatively large opening to be formed at any point in the mesh of the net to enable the muzzle of a gun to be passed through such opening or to enable a man to pass therethrough without tearing the net. The resulting looseness between the strips enables different portions of the net to be disposed above or below adjacent portions so as to produce a pronounced three dimensional effect in addition to an uneven texture and irregularity of cast shadows. Furthermore, the net takes on much of this irregularity of pattern and form solely from the handling and draping of the net. Hence a great saving of time results from the fact that in many instances the desired irregularity of pattern and camouflage effect are rendered complete merely upon the net being strung up or draped. The interlocking relation of the strips prevents the strips being shifted so far as to weaken the texture of the net or to produce such a large opening as to negative the camouflage value of the net.

Another feature of my improved camouflage net is that it can be made up beforehand in the form of a complete unit or units, of predetermined size and shape for later use as occasion arises, or it can be made up on location of any size or shape necessary to meet the immediate requirements.

Other noteworthy features of my invention are that the net may be made light enough and can be folded up compactly enough to be carried in places where weight and space are important factors.

Other features, objects and advantages of the invention will appear from the following detailed description of certain preferred embodiments of the invention. In the accompanying drawings illustrating such embodiments:

Figure 1 is a fragmentary plan or elevational view of one embodiment wherein the interthreading openings in the strands of webbing are made in the form of slits or buttonholes;

Figure 2 is an elevational view of a stock length of webbing used in making up the net of Figure 1;

Figure 3 is a fragmentary elevational view showing how the strips can be pushed sidewise or slid endwise through limited distances to establish irregularity of pattern, and also to provide openings of substantial size to permit the muzzle of a gun to be passed therethrough or to enable a man to pass therethrough;

Figure 4:
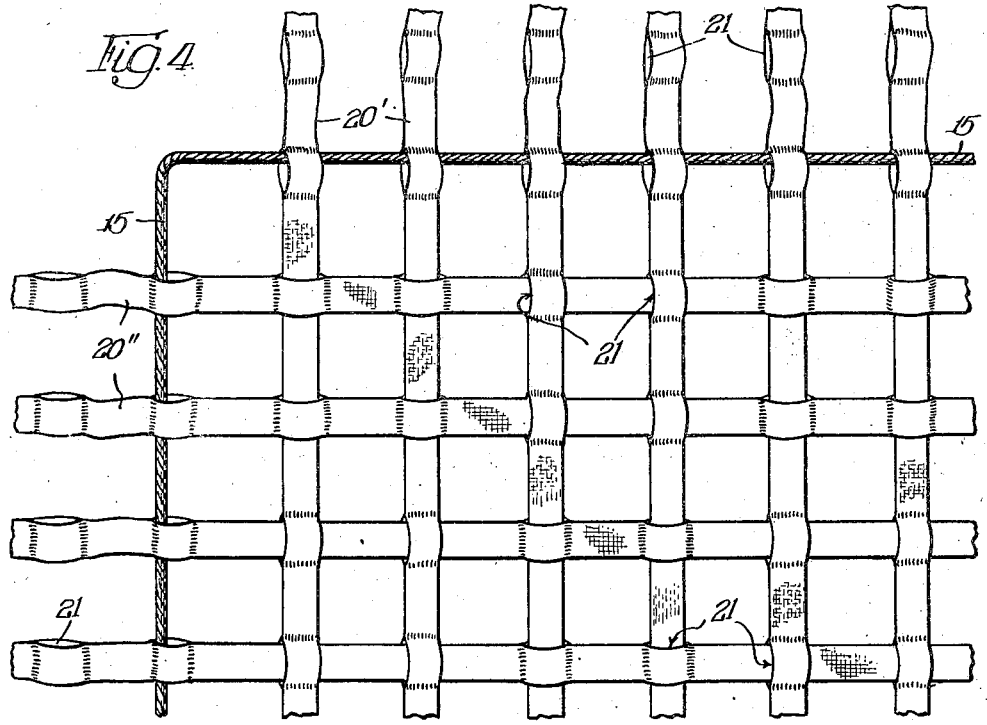
Figure 4 is a view similar to Figure 1 showing a modified embodiment wherein the interthreading openings in the strips are in the form of loops produced by dividing the warp of the webbing into upper and lower layers.

Referring first to the embodiment shown in Figures 1, 2 and 3, this construction is made up of light weight cotton webbing 10 (Figure 2) which can be made in any desired color, preferably being of the gray-green hue characteristic of military material. This webbing is preferably processed to be fire-retardant, mildew-proof and water-repellant. Woven into the webbing at spaced distances are longitudinally extending openings 11 in the form of slits or buttonholes preferably having selvedge edges to prevent ravelling. Each of these openings 11 is of the same length or slightly longer than the width of the webbing itself. Experimentation has shown what I regard to be certain preferred proportions for the width of webbing and spacing of the openings 11. Preferably the webbing has a width in the general neighborhood of two inches, and the spacing between the ends of the openings 11 is preferably about three inches, thus producing a pitch spacing of about five inches between centers of openings 11. It will be understood that these dimensions are given merely to illustrate what I regard to be the preferred proportions and are not limitative of the invention. In making up any desired size of camouflage net, the stock strip 10 is cut up to provide the necessary number of lengthwise strips 10' and the necessary number of crosswise strips 10'' (Figure 1) corresponding to the length and width of the desired net. The strips are now interwoven in the interlocking relation illustrated in Figure 1, which relation allows a substantial displacement or shifting of the strips relatively to one another but which prevents any portion of the mesh from being spread apart into an opening which is too large in size, i. e., an opening which might destroy the desired camouflage effect of the net. This is preferably attained by a "2 and 2" weave wherein each strip passes through the openings 11 of two successive strips, then has the next two crosswise strips pass through its openings 11, then passes through the opening 11 of the next two crosswise strips, and so on across the entire length or width of the net. This same "2 and 2" weave is carried out with respect to each lengthwise strip 10' and each crosswise strip 10'' so that the weave is symmetrical at all points both lengthwise and crosswise of the net. The result of this interwoven relationship is that all of the strips 10' and 10'' have a desired looseness or freedom relatively to each other for producing a desired irregularity of pattern, but without permitting the mesh of the net to open up into holes of objectionably large size. The ability to open up the mesh a limited distance permits projecting a relatively large caliber gun barrel through the net, also enabling a man to crawl through the net. For example, in Figure 3 I have shown how an adjacent pair of lengthwise strips 10' have been spread apart horizontally, and how an adjacent pair of crosswise strips 10'' have been spread apart vertically to produce a relatively large opening 12. For sake of illustration I have shown a relatively large caliber gun barrel 13 extended through this opening 12, and it will also be understood that this opening is capable of passing a man therethrough. When separating the mesh for obtaining such a relatively large size opening, the separation is preferably made at a point between the adjacent strips of an associated pair of lengthwise strips 10' and between the adjacent strips of an associated pair of crosswise strips 10'' in the "2 and 2" weave of the net. For example, in Figure 3 this paired relationship has enabled the right hand vertical strip 10' to be pushed relatively far to the right and the left hand vertical strip 10' to be pushed relatively far to the left, and, similarly, this paired relationship has enabled the upper crosswise strip 10'' to be pushed a substantial distance upwardly and the lower crosswise strip 10'' to be pushed a substantial distance downwardly. It will be understood that the next adjacent strips above and below and to right and left of those shown spread apart can also be spread or shifted outwardly to form a larger hole if necessary. I find that the "2 and 2" weave enables the mesh to be quickly separated into such an opening 12 of the approximate size above stated, particularly when the strip material 10 and the pitch spacing of the openings 11 have the approximate dimensions set forth above. However, other weaves, such as a "3 and 3" or "4 and 4" weave, might be used, or an irregular combination, such as "2 and 3" or "3 and 4," particularly when using strip material 10 and pitch distances between openings of other dimensions than those set forth above. Figure 1 illustrates the net drawn taut for facility of illustration, but it will be understood that in actual use it would have an irregular broken pattern or crumpled appearance.

The perimeter of the camouflage net is preferably given a rope binding consisting of a length of rope 15 of any desired weight and texture. The ends of all of the lengthwise strips 10' and crosswise strips 10'' are folded over and sewed at 16 to forms the loops 17. The rope binder 15 is then passed through these loops. The rope binder facilitates handling and draping the net.

Figure 5:
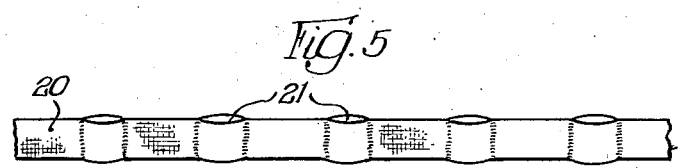
Figure 5 is a perspective view of a length of stock webbing used in making up the net of Figure 4, the perspective angle of this view clearly illustrating the openings or loops.
Figure 6:
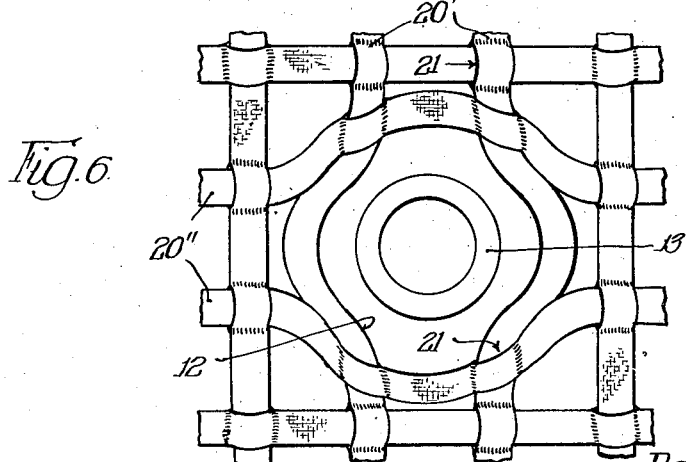
Figure 6 is a view similar to Figure 3 showing the strips pushed out of normal position to produce irregularity of pattern, or to enable a gun barrel or a man to pass through the net.

Referring now to the embodiment illustrated in Figures 4, 5 and 6, this construction is also made up of light weight cotton webbing 20 (Figure 5) in which openings 21 are provided at uniformly spaced distances. However, in this embodiment these openings are in the form of through pockets extending from edge to edge of the webbing, being formed by dividing the warp of the webbing and forming two thicknesses of webbing at that point, these two thicknesses forming the through pocket or loop 21. Such loop opening is of a length substantially equal to or slightly greater than the width of the webbing 20, so that crosswise strips of the same webbing can be readily passed through these loops 21. In this embodiment I preferably use webbing of approximately 1½" width and form the openings 21 of approximately 2" length spaced about three inches apart so that the pitch spacing between strips is approximately five inches. Here again, it will be understood that these dimensions are given merely to illustrate what I regard to be the preferred proportions and are not limitative of the invention. The lengthwise strips 20' and the crosswise strips 20" are preferably interwoven in the "2 and 2" weave described above of the preceding embodiment. That is to say, each strip passes through the loops or openings 21 of two successive crosswise strips, then has the next two crosswise strips pass through its openings 21, then passes through the openings 21 of the next two crosswise strips, and so on across the entire width or length of the net, this weave being symmetrical with reference to the lengthwise strips and the crosswise strips.

Since loops or pockets 21 are already woven into this type of net, a rope binding 15 is optional, and a piece of the web itself can be used as a binder seizing only the corners of the net to prevent unlocking. Each lengthwise strip and each crosswise strip has its ends extending one to two feet or more beyond the edge of the net to form free tag ends which can be arranged in any irregular pattern. Thus the appearance of a sharp marginal edge of the net is avoided. If a rope binder 15 is used, these flapping ends extend substantially that distance beyond the binder. This latter embodiment of camouflage net is stronger than the preceding embodiment of Figures 1, 2, and 3, particularly where tearing is concerned, and also has the added advantage of affording the tag or flapping ends of any desired length instead of each strip ending in a sewed loop. The latter embodiment of Figures 4-6 can also have its mesh separated or opened up in substantially the same manner described above of the preceding embodiment. Thus, in Figure 6 two of the lengthwise strips 20' of an adjacent pair have been spread apart horizontally and two crosswise strips 20" of a companion pair have been spread apart vertically to form the opening 12. This opening can accommodate a large caliber gun barrel 13, and can also be made of appropriate size and shape to permit a man to crawl therethrough. As in the form shown in Figures 1, 2, and 3, the next adjacent strips can also be shifted to form a larger opening.

I shall now describe the preferred method of making up or assembling the type of net illustrated in Figures 1-3, and the type of net illustrated in Figures 4-6. The strips should first be cut to the desired length, always cutting half way between the slit openings 11 or half way between the loop openings 21 to avoid waste. In the case of the embodiment of Figures 1-3, approximately 3½ inches of strip are left over and above the desired length at each end of the strip to provide for the sewn loops 17. In the case of the embodiment of Figures 4-6, a flapping end of from 12 inches to 24 inches over and above the desired length of strip is added for each end of the strip. The first strip will serve as a sample for cutting the others. If one dimension of the net is greater than the other, the counting of the slit openings 11 (Figures 1-3) on the longer strip will denote the number of smaller strips needed. Similarly, the number of longer strips needed may be ascertained by counting the slit openings 11 in the smaller strips. If the net is square, one counting of the openings will be sufficient to ascertain the total number of strips. This can also be done in the case of the strips for the embodiment of Figures 4-6 after making due allowance for the lengths of the flapping ends. It is preferable to keep the different sizes of strips stored in separate piles. In the case of the strips 10' and 10", the ends thereof are turned over to form the loops 17 and are sewed with a double row of stitching.

The interweaving of the strips is facilitated by first setting up a rope frame of the desired size of the net, as by attaching the corners of this rope frame to convenient solid objects. The first two strips of either type are then stretched across the center of this rope frame. It has been found convenient to attach the strips to the rope frame by the use of small S hooks, inasmuch as the strips have to be frequently attached and detached in the process of assembling. Through the center openings 11 or 21 of these first two strips pass a second pair of strips and attach to the frame. Now proceeding to one side of the second pair, take a third pair of strips and instead of passing them through the first pair as before, pass the first pair through them at their center openings 11 or 21. This is important since it produces the locking feature of the net. Thereafter proceed the same way on the opposite side of the second pair, i. e., on the opposite side of the center of the net and then take the remaining sides and proceed as before, being sure that every pair is put through the opposite way from the pairs next to them. It should be noted that each pair has to be woven with more and more strips as the square grows larger. When the weaving reaches the rope frame, then thread a length of rope through the loops 17 or through the remaining adjacent openings 21 (Figure 4) and splice the ends of this rope. The net may then be detached from the rope frame and put into use or stored away, and a new net started on the same frame. In the event that rope is scarce at that particular location, the final net may be detached and carefully laid on the floor or ground, whereupon the rope frame may be taken down and used as the binding rope for this net.

While I have illustrated and described what I regard to be the preferred embodiments of my invention, nevertheless it will be understood that such are merely exemplary and that numerous modifications and rearrangements can be made therein without departing from the essence of the invention.

I claim:

1. In a camouflage net, the combination of a lengthwise series of strips of flat fabric webbing, a crosswise series of strips of flat fabric webbing, and preformed slit-like openings in substantially uniformly spaced sequence in each of said strips, said openings extending at right angles to the flat dimensions of said strips and having selvedged edges, the strips of each series being woven through the openings in the strips of the other series in a predetermined weave, whereby said strips have limited endwise sliding freedom in said openings and limited sidewise freedom, because of said openings, on strips of the other series.

2. A camouflage net comprising a first series of relatively thin flat fabric strips and a second series of relatively thin flat fabric strips extending at an angle to each other to form a large mesh openwork pattern, and preformed slit-like openings in each of said strips having selvedged edges through which strips of the other series are passed in a weave which permits the mesh to be separated for permitting objects to be projected or passed through the net.

3. The method of making a camouflage net which comprises forming regularly spaced openings in fabric webbing of the class described, cutting said webbing into a first series of strips adapted to extend lengthwise of the net and into a second series of strips adapted to extend crosswise of the net, erecting a rope frame of the approximate size of the desired net, stretching a pair of strips of one series across the center of said frame in one direction, stretching a pair of strips of the other series across the center of said frame in the other direction, passing one of said pairs of strips through the openings in the other of said pairs of strips, and progressively stretching other pairs of strips across the frame to each side of said first mentioned pairs of strips, and passing the strips of each series through the openings in the strips of the other series to form a "2 and 2" weave between the two series of strips.

4. The method of making a camouflage net which comprises forming regularly spaced openings in fabric webbing of the class described, cutting said webbing into a first series of strips adapted to extend lengthwise of the net and into a second series of strips adapted to extend crosswise of the net, erecting a rope frame of the approximate size of the desired net, stretching a strip of one series across the center of said frame in one direction, stretching a strip of the other series across the center of said frame in the other direction, passing one of said strips through an opening in the other of said strips, and progressively stretching other strips across the frame to each side of said first mentioned strips, and passing the strips of each series through the openings in the strips of the other series to form a weave between the two series of strips.

DAVID L. SWASEY.